Feb. 1, 1938.                J. W. ETCHISON                2,107,111
                        HYDRAULIC BRAKE APPARATUS
                          Filed July 24, 1936            3 Sheets-Sheet 1
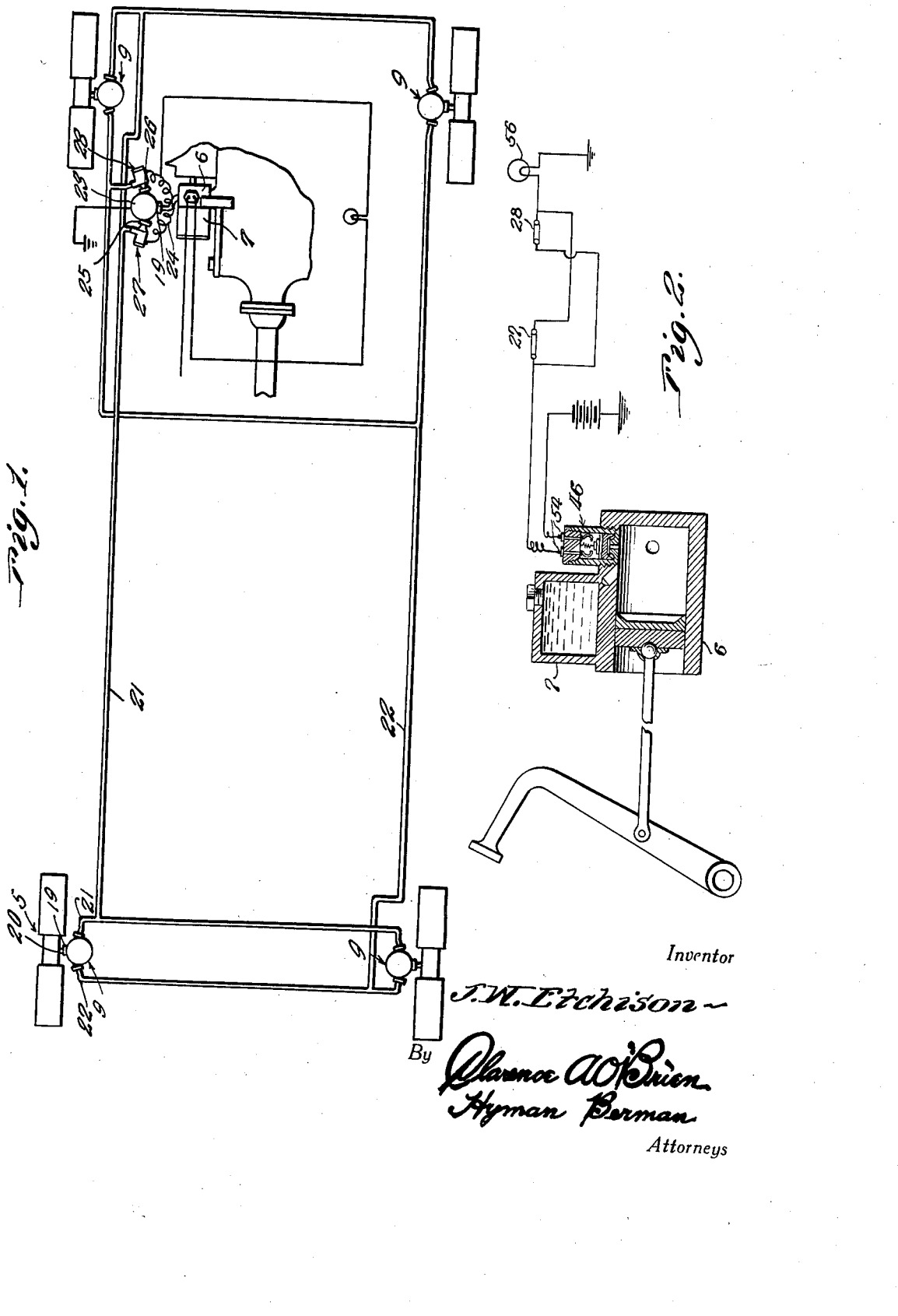
Inventor
J. W. Etchison
By Clarence A. O'Brien
   Hyman Berman
                Attorneys

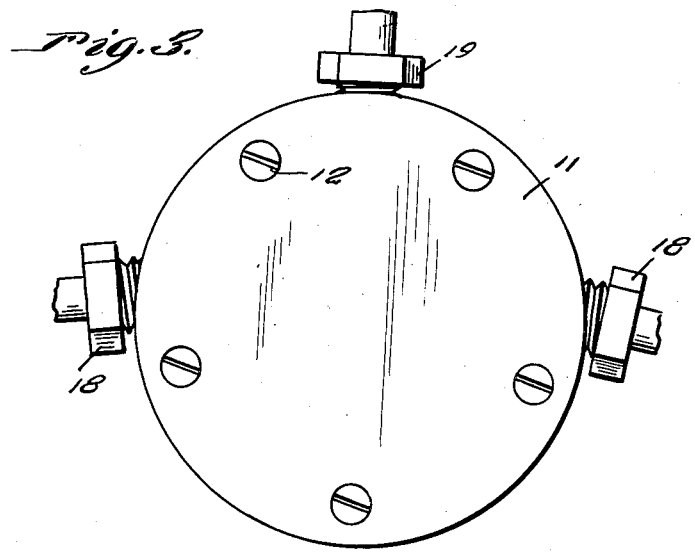
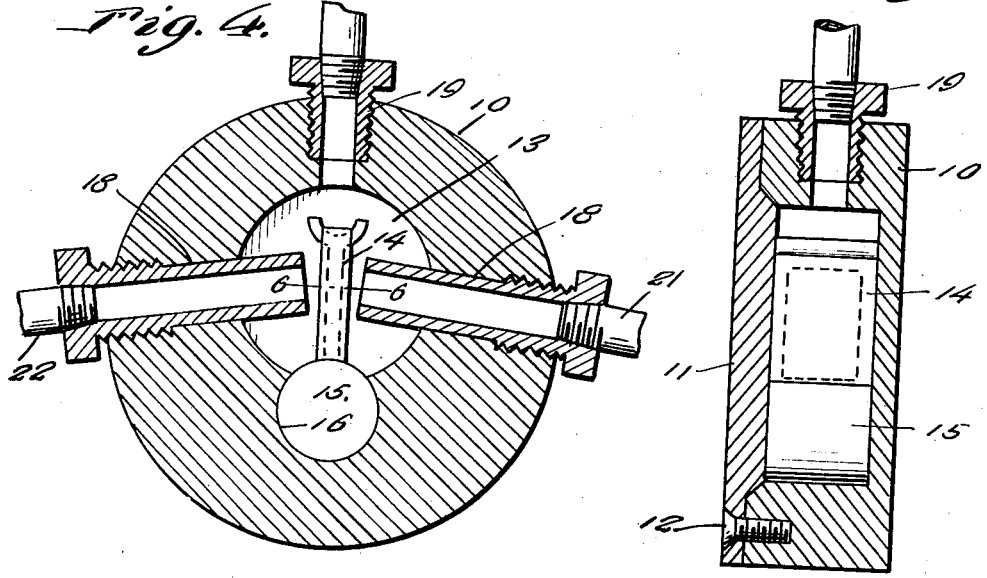

Feb. 1, 1938.　　　J. W. ETCHISON　　　2,107,111
HYDRAULIC BRAKE APPARATUS
Filed July 24, 1936　　　3 Sheets-Sheet 3

Inventor
J. W. Etchison
By Clarence A. O'Brien
Hyman Berman
Attorneys

Patented Feb. 1, 1938

2,107,111

UNITED STATES PATENT OFFICE 2,107,111

HYDRAULIC BRAKE APPARATUS

James W. Etchison, Cleveland, Ohio

Application July 24, 1936, Serial No. 92,451

5 Claims. (Cl. 188—152)

This invention relates to vehicular brakes of the hydraulic type and an object of the invention is to provide in a hydraulic brake apparatus means whereby, in the event of breakage of one of two actuating fluid conduits or passages such one conduit is automatically closed, leaving the apparatus controlled through the other conduit in operative condition.

A further object of the invention is to provide in a hydraulic brake apparatus for vehicles means for automatically indicating when one of the two actuating fluid conduits or passages are out of proper working condition to the end that the driver of the vehicle can instantly take the necessary steps to remedy such a condition.

The invention together with its objects and advantages will be best understood from a study of the following description taken in connection with the accompanying drawings wherein:—

Figure 1 is a plan view of a hydraulic vehicular brake system embodying the features of the present invention.

Figure 2 is a wiring diagram.

Figure 3 is a plan view of a valve forming part of the present invention.

Figure 4 is a sectional view through the valve.

Figure 5 is a sectional view through the valve taken at right angles to Figure 4.

Figure 6 is a detail view taken substantially on the line 6—6 of Figure 4.

Figure 7:
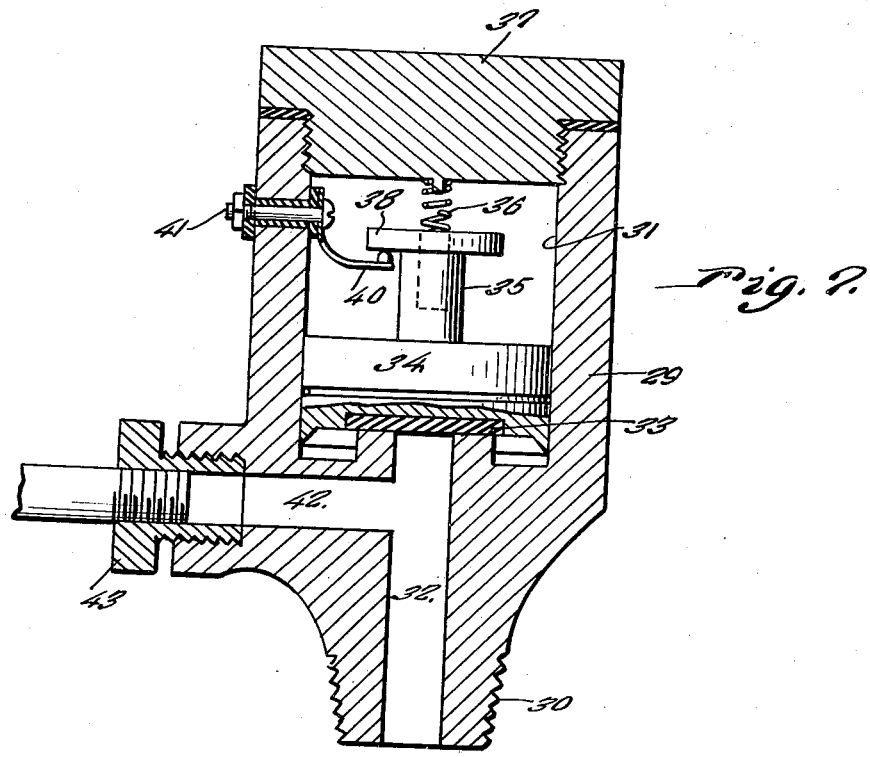
Figure 7 is a sectional view through a switch forming part of the invention.

Referring to the drawings by reference numerals it will be seen that each of the vehicular wheel brakes is indicated generally by the reference numeral 5 while the master cylinder is indicated by the reference numeral 6 and the reservoir for the master cylinder forming part of the hydraulic brake system is indicated generally by the reference numeral 7. The brake pedal is indicated by the reference numeral 8.

In accordance with the present invention there is provided for each of the brakes 5 a valve 9, and each of the valves 9 includes a substantially circular casing 10 of suitable construction having a removable cover plate 11 secured in position through the medium of screws 12.

The valve casing 10 is provided with a chamber 13 in which operates a gate valve 14 formed integrally with a substantially cylindrical pivot shaft 15 suitably journaled in the valve casing as at 16. The valve member 14 is in the form of a metal plate over which is disposed a sheathing 17 of rubber or other suitable material as clearly suggested in Figure 6.

The valve member 14 works within the chamber 13 between the inner ends of nipples 18 threadedly secured within suitable bores provided therefor in the peripheral wall of the casing 10. Also threaded into a suitable bore provided in the casing 10 in proper position relative to the nipples 18 is a nipple 19.

The cylinder of each brake 5 is connected with the casing 10 of its associated valve 9 through the medium of the nipple 19.

Also connected with one side of the four valves 9 through the medium of nipples 18 provided at one side of the valve casings 10 is an actuating fluid passage or conduit 21 while connected with the opposite sides of the valves 9 through the medium of the nipples 18 at the last mentioned sides of the valve casings 10 is a second actuating fluid passage or conduit 22. Thus it will be seen that either conduit 21 or 22 may be used for feeding the fluid to the cylinders of the brakes 5 for applying said brakes.

Interposed between the master cylinder 6 and the fluid passages or conduits 21, 22 is a valve 23 which is substantially identical in construction with the aforementioned valves 9 and the valve 23 is, through the medium of a nipple 19a connected with the outlet of the master cylinder 6 as shown in Figure 1.

The casing of the valve 23 also has threaded in opposite sides thereof nipples 25 and 26 corresponding to the aforementioned nipples 18.

Interposed between the valve 23 and the fluid passage or conduit 21 is a pressure controlled switch 27 while a similar switch 28 is interposed between the opposite side of the valve 23 and the fluid passage or conduit 22.

The pressure controlled switches 27, 28 are identical in construction and a detailed description of one will teach the other.

Thus, referring to Figure 7, it will be seen that each of the aforementioned control switches 27, 28 includes a casing 29 having an end 30 adapted to be threaded into engagement with a nipple 25 or 26 as the case may be. Also the casing 29 is provided with a chamber 31 to which leads a passage 32 at the end of which within the chamber 31 is formed a stop against which seats a protective plate 33 on the bottom of a piston valve 34 that has a working fit within the cylindrical chamber 31. The piston valve 34 is provided with a short rod 35 that is socketed to receive one end of a spring 36 the other end of which is suitably engaged with a closure plug 37 provided for the chamber 31 of the casing 29. Spring 36 serves to normally engage the disk valve 34 with its seat 33.

The stem 35 is provided with an enlarged head of conductive material forming one contact 38 of the switch the other contact of which is indicated by the reference numeral 40 and is connected with a suitable binding post 41 provided on and insulated from the wall of the casing 29 as shown in Figure 7. Under action of spring 36 not only is the piston valve 34 held seated but also the contact 38 is held in engagement with the contact 40 as shown in Figure 7. Leading laterally from the passage 32 is a passage 42 in the free end of which is threaded a coupling nut or fitting 43.

In the case of the pressure responsive switch 27 it will be seen that the passage 42 thereof is connected through the medium of the coupling nut 43 with a flange of the conduit 21 while with regard to the pressure controlled switch 28 the passage 43 thereof is connected through the medium of a coupling nut 43 with a flange of the conduit 22.

Suitably tapped into the top of the master cylinder 6 is the casing 44 of a pressure responsive switch indicated generally by the reference numeral 46.

The casing 45 in the end thereof threaded into the master cylinder 6 is provided with a fluid passage 47 the inner end of which is formed to provide a stop against which seats the protective plate 48 of a piston valve 49 having a working fit within the casing 45. A suitable spring device 50 is provided for yieldably engaging the piston valve 49 with its seat 48. Suitably secured on and insulated from the piston valve 49 is a contact ring 51 with which are cooperable spring contacts 52 secured to the plug 53 provided for the casing 45 through the medium of binding posts 54 which are insulated from the plug 53 as indicated at 55.

Figure 8:
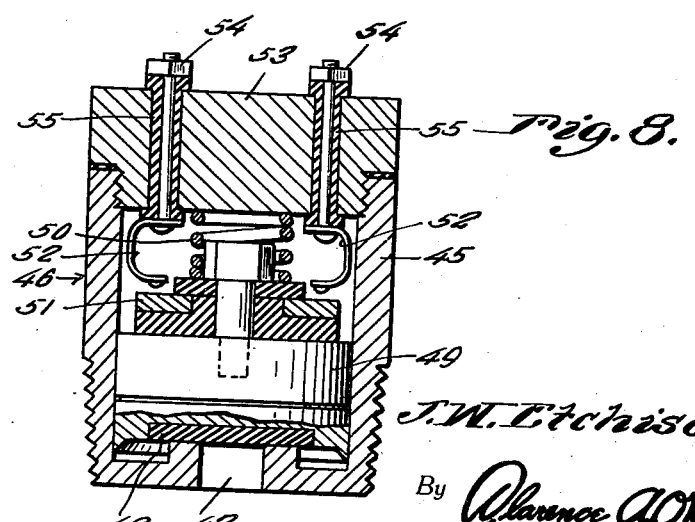
Figure 8 is a sectional view through a second switch forming part of the invention.

Referring to Figure 8 it will be seen that normally contact 51 is out of engagement with contacts 52. However, when the pedal 8 is depressed for applying the brake the fluid pressure will operate on the piston 49 for unseating the same against the action of spring 50 and thereby engage the contact member 51 with the contacts 52 so that in the event either switch 27, 28 remains closed, the circuit will be completed through the closed switches and a signal lamp 56 suitably mounted on the instrument board of the vehicle for indicating that one of the lines 21, or 22 is not in proper working order.

The operation of the device may be briefly explained as follows:

To apply the brakes the pedal is depressed in the usual manner. Upon depression of the pedal 8 the fluid from the master cylinder 6 will exert a pressure on the piston valve 49 for unseating the valve against the action of spring 50 and engage contacts 51 with the contacts 52. Also fluid will flow from the master cylinder 6 into the valve 23 passing from the valve 23 through the passages in the casings 29 of the switch assemblies 27, 28 and into the conduits 21, 22 to flow through the conduits and through the valves 9 into the cylinders of the brakes 5 for applying the brakes.

In connection with the above it will be understood that if the lines 21, 22 are in good order as well as also the cylinders of the brakes 5, pressure in both of the valves 27, 28 will be such as to unseat the valve pistons 34 to separate the contacts 38 and 40 before contacts 51, 52 are engaged so that the circuit through the warning signal 56 will remain interrupted, in the event both lines are in good working condition.

Assuming, however, for example, that a leak has occurred in the line 21. Thus upon depression of the brake pedal 8 for applying the brakes the fluid pressure within the valve 23 will become unequalized so that the valve element of the valve 23 and corresponding to the valve element 14 of a valve 9 will rock to one side for closing communication between the valve 23 and the fluid conduit 21. Thus the flow of fluid through the line 21 will be cut off with the result that the fluid will flow only through the line 22, the pressure of the fluid acting on the valve elements 14 in the valve 9 to seat the valve elements against the inner ends of those nipples 18 to which the conduit 21 is connected so that the fluid will flow freely only through the line 22 and through the valves 9 at one side only of the valves and into the cylinders of the brakes 5 for applying the brakes.

This lost pressure in the line 21 will of course result in the piston valve 34 forming part of the pressure controlled switch assembly 27 remaining seated under action of spring 36 so that the circuit through switches 46 and 27 and through lamp 56 will be completed to warn the operator that one of the lines, line 21, is out of working order.

From the above it will therefore be seen that in accordance with the present invention should a leak occur in either line 21, 22, that line will be automatically closed, signal 56 illuminated, and the apparatus then controlled through the other conduit until the defect has been remedied.

It is thought that a clear understanding of the construction, utility and advantages of an invention of this character will be had without a more detailed description, and further it will be understood that while the invention has been described herein in detail with reference to a hydraulic brake the invention is also applicable to air or analogous brake systems.

Having thus described the invention what is claimed as new is:—

1. In a hydraulic brake apparatus, a plurality of hydraulic vehicular wheel brakes, a master cylinder, a pair of fluid conduits, a valve connecting said conduits with said master cylinder and including a casing having an inlet port connected with the master cylinder and a pair of opposed outlet ports one for each of said conduits, a valve element positioned between said outlet ports and capable of movement in both directions under the influence of the fluid for opening one of the outlet ports and for closing the other of said outlet ports, and a valve for each vehicular wheel brake including a casing having an outlet port connected with the associated wheel brake, a pair of oppositely disposed inlet ports one for each of said conduits, and a valve element positioned between said inlet ports capable of movement in both directions under the influence of fluid to open one of the inlet ports and to close the other of said inlet ports.

2. In a hydraulic brake apparatus, a plurality of hydraulic vehicular wheel brakes, a master cylinder, a pair of fluid conduits, a valve connecting said conduits with said master cylinder and including a casing having an inlet port connected with the master cylinder and a pair of opposed outlet ports one for each of said conduits, a valve element positioned between said outlet ports and capable of movement in both directions under the influence of the fluid for opening one of the outlet ports and for closing the other of said outlet ports, and a valve for each vehicular wheel brake including a casing having an outlet port connected with the associated wheel brake, a pair of oppositely disposed inlet ports one for each of said conduits, and a valve element positioned between said inlet ports capable of movement in both directions under the influence of fluid to open one of the inlet ports and to close the other of said inlet ports, a signalling device, and means connected with said device and with the hydraulic brake apparatus for operating the signal device in the event of a breakage or leakage in either of the said conduits.

3. In a hydraulic brake apparatus, a plurality of vehicular wheel brakes, a pair of conduits for the brakes, one valve connecting each pair of conduits with a vehicular wheel brake and movable in response to fluid pressure for checking the flow of fluid from one conduit to the associated wheel brake while maintaining an uninterrupted flow of fluid from the other conduit to the associated wheel brake, a pedal-controlled master cylinder, a valve connecting the conduits with the master cylinder and operable in response to fluid pressure and in consonance with the aforementioned valve for checking the flow of fluid from the master cylinder to one of the conduits and maintaining a free flow from the master cylinder to the other of the conduits in the event of breakage in either of the conduits.

4. In a hydraulic brake apparatus, a plurality of vehicular wheel brakes, a pair of conduits for the brakes, one valve connecting each pair of conduits with a vehicular wheel brake and movable in response to fluid pressure for checking the flow of fluid from one conduit to the associated wheel brake while maintaining an uninterrupted flow of fluid from the other conduit to the associated wheel brake, a pedal-controlled master cylinder, a valve connecting the conduits with the master cylinder and operable in response to fluid pressure and in consonance with the aforementioned valve for checking the flow of fluid from the master cylinder to one of the conduits and maintaining a free flow from the master cylinder to the other of the conduits in the event of breakage in either of the conduits, a signal device, and means operatively connected with the signal device, the valve connection between the conduits and the master cylinder, and also with the master cylinder for operating said signal in the event of breakage in either of the conduits.

5. In a hydraulic brake apparatus, a plurality of vehicular wheel brakes, a pair of conduits for the brakes, one valve connecting each pair of conduits with a vehicular wheel brake and movable in response to fluid pressure for checking the flow of fluid from one conduit to the associated wheel brake while maintaining an uninterrupted flow of fluid from the other conduit to the associated wheel brake, a pedal-controlled master cylinder, a valve connecting the conduits with the master cylinder and operable in response to fluid pressure and in consonance with the aforementioned valve for checking the flow of fluid from the master cylinder to one of the conduits and maintaining a free flow from the master cylinder to the other of the conduits in the event of breakage in either of the conduits, an electrical circuit, an electrically operable signal arranged in said circuit, a pressure responsive switch arranged in said circuit and connected with the master cylinder in a manner to be closed in response to fluid pressure from said cylinder, and fluid operated switches interposed between the last named valve and the conduits, the last mentioned switches being normally closed and operable in response to fluid pressure to move to open position, the last named switches being also arranged in said circuit and cooperable with the first-named switch for completing the circuit through the signal element in the event of breakage in either of said conduits.

JAMES W. ETCHISON.